United States Patent
Deeds

(10) Patent No.: US 10,074,249 B1
(45) Date of Patent: Sep. 11, 2018

(54) METHOD OF DETERMINING IF PERSONAL BELONGING OR SPACE HAS BEEN DISTURBED WITH CAMERA, WIFI AND BLUETOOTH COMMUNICATION

(71) Applicant: Nathan Gregory Deeds, Novato, CA (US)

(72) Inventor: Nathan Gregory Deeds, Novato, CA (US)

(73) Assignee: Nathan Deeds, San Rafael, CA (US)

( * ) Notice: Subject to any disclaimer, the term of this patent is extended or adjusted under 35 U.S.C. 154(b) by 0 days.

(21) Appl. No.: 15/412,037

(22) Filed: Jan. 22, 2017

(51) Int. Cl.
*G08B 13/14* (2006.01)
*H04W 4/00* (2018.01)
*H04W 4/80* (2018.01)

(52) U.S. Cl.
CPC ..... *G08B 13/1436* (2013.01); *G08B 13/1481* (2013.01); *H04W 4/008* (2013.01); *H04W 4/80* (2018.02)

(58) Field of Classification Search
CPC .................................................. G08B 13/1436
USPC ......... 340/568.1, 628, 632, 540, 541, 539.1, 340/545.1
See application file for complete search history.

(56) References Cited

U.S. PATENT DOCUMENTS

| | | | |
|---|---|---|---|
| 6,796,799 B1* | 9/2004 | Yoshiike | G06F 19/3418 434/236 |
| 8,447,273 B1* | 5/2013 | Friedlander | H04M 1/72577 382/115 |
| 2016/0093198 A1* | 3/2016 | Tung | G08B 25/016 340/539.11 |

* cited by examiner

*Primary Examiner* — Tai T Nguyen

(57) ABSTRACT

The present invention provides a method of detection disturbances of movement and light for semi-secure items via a bluetooth enabled 'chip' which will alert a cellular device within range of any changes via 1) gyroscope and 2) photocell or other light measuring device. Data collection from the device is started by pressing a button, after which a ten second period is afforded to place the device in location to be monitored. Upon the completion of the ten seconds, the device will take a 'fingerprint' of current conditions (light, position) and enter low energy state. If no environmental changes have been observed, the device will register a message indicating such on the cellular device once the cellular device comes in range. If environmental changes have been made, the device will indicate the disturbance type (light and/or movement) as well as the time the disturbance(s) occurred.

1 Claim, 3 Drawing Sheets

Exterior of device

The top and bottom of the device include optically clear areas (101 and 102 on top and bottom, respectively to allow light to enter the light sensor.

Figure 1:
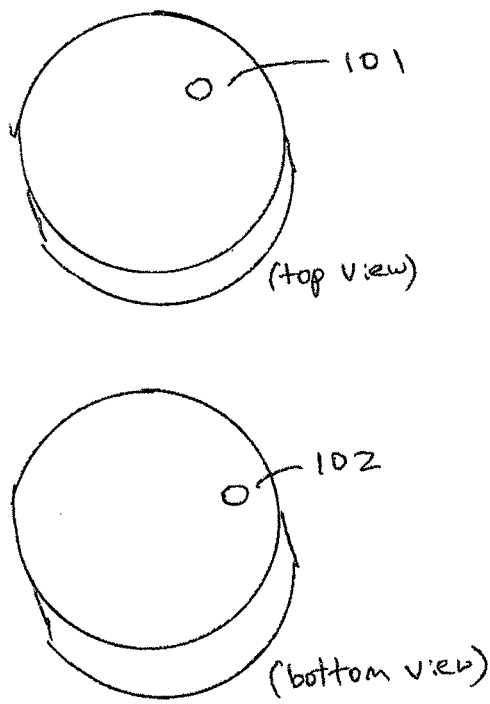

Figure 1, Exterior of device

The top and bottom of the device include optically clear areas (101 and 102 on top and bottom, respectively to allow light to enter the light sensor.

Figure 2:
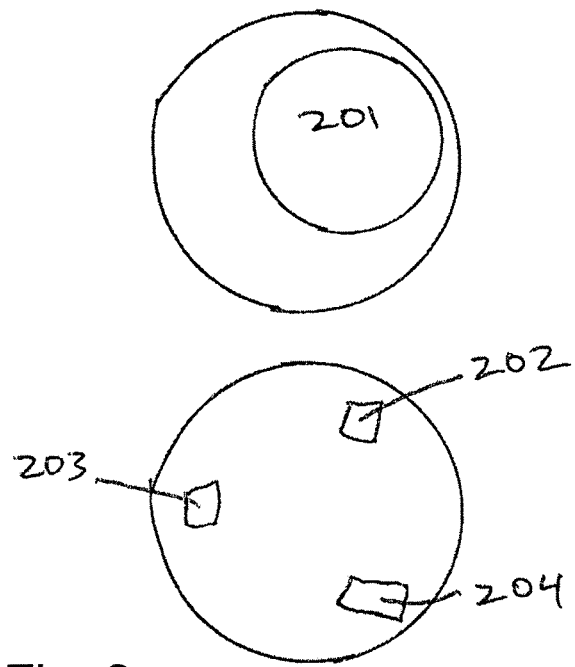

Figure 2, Interior of device

The interior of the device includes a battery (201) and circuit board including Bluetooth low energy antenna (203), onboard memory (203) and 3-axis gyroscope and light sensor (204).

Figure 3:
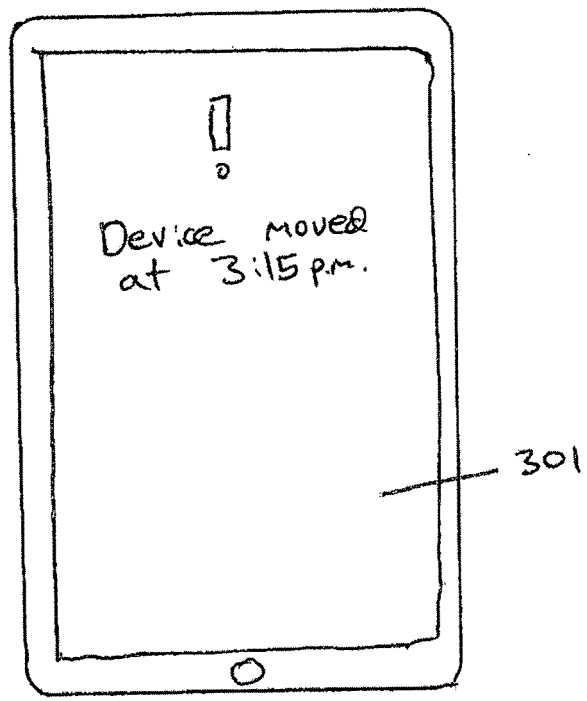

Figure 3, Mobile/Cellular Application

The device will communicate via Bluetooth and and alert the user of device movement or environmental changes via mobile application (301).

METHOD OF DETERMINING IF PERSONAL BELONGING OR SPACE HAS BEEN DISTURBED WITH CAMERA, WIFI AND BLUETOOTH COMMUNICATION

CROSS-REFERENCE TO RELATED APPLICATIONS

Child patent filed EFIS id: 28128480, application Ser. No. 15/412,037.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

EFIS ID 21690972, Application No. 62/128,970

STATEMENT REGARDING PRIOR DISCLOSURES BY THE INVENTOR OR A JOINT INVENTOR

Not applicable

BACKGROUND OF THE INVENTION

Burglar alarms only cover doors and windows and security cameras won't work in the bathroom. This device allows you to monitor your personal belongings where alarms and cameras cannot. The device will work in medicine cabinets, office drawers and in your car.

(1) Field of the Invention

Personal electronics and security.

(2) Description of Related Art Including Information Disclosed Under 37 CFR 1.97 and 1.98

Not applicable

BRIEF SUMMARY OF THE INVENTION

The security alarm consists of electronics and sensors allowing the user to determine if their personal belongings or space around a belonging have been moved or disturbed.

BRIEF DESCRIPTION OF THE SEVERAL VIEWS OF THE DRAWING(S)

FIG. 1, Exterior of security device
FIG. 2, Interior of security device
FIG. 3, Mobile/cellular application

DETAILED DESCRIPTION OF THE INVENTION

The device will be an enclosure made of plastic/polymer or rubber containing electronics consisting of a 3-axis gyroscope/acceleromoter and a light/photo sensor, as well a rechargeable battery and method of electronic data storage (memory) along with a low energy Bluetooth antenna. The holes on the top and bottom, notated in attached drawing 1 Exterior, allow the light to enter the photocell and motion sensor. A charging connector plug is also contained on the bottom of the device.

The device will be manufactured on circuit board with most components soldered/connected to the board, with the exception of the battery which will be connected to the board via wires. The component layout is notated in the attached drawing 2, Interior.

The device will begin to monitor its environment via environmental polling via activation from a connected Bluetooth device (mobile/cellular phone Application) or via an external arming button. and store any changes in detected environment/device state to the onboard memory. Changes in state include motion detection, change in ambient light conditions or movement of the device or its environment.

The device will communicate changes in environment/device state back to the application via Bluetooth when in range continuously, as notated in attached drawing 3 Mobile/Cellular application component.

In the event the mobile device is 'out of range', the device will store the environmental/device states obtained via polling and send back to the device when in range. The device will alert the user if the environment/device has changed (eg movement via activation of the 3-axis gyroscope, and/or lighting changes due to light/photosensor activity.

The invention claimed is:

1. A system for monitoring personal belongings, consisting of:
    a waterproof housing having holes on a top, bottom and side of said housing to allow light to reach an interior of the housing, wherein said housing being attached to each of the monitored belonging and the personal belongings being located in a cabinet after attached to the housing, the waterproof housing comprises:
    a plurality of photo-sensors, each photo-sensor being located behind said hole and configured to detect ambient light around the housing when said housing being exposed to an ambient environment when the cabinet has been opened;
    a motion sensor configured to detect motion when someone attempts to move the housing from the cabinet;
    a logic circuitry, connecting to said the photo-sensor and said motion sensor for receiving detected parameters generated from the photo-sensor and motion sensor, for computing said parameters and storing disturbance events; and
    a mobile device associated with a user,
    wherein in an event of ambient environment around the housing has changed and the housing being disturbed, said event and time will be logged on the logic circuitry and transmitted back to the mobile device via Bluetooth when the mobile device is in proximity to the housing,
    wherein in the event the mobile device is out of range, said logic circuitry will store the parameters obtained via polling and send back to the mobile device when in range.

* * * * *